(12) United States Patent
Fukui et al.

(10) Patent No.: US 11,315,739 B2
(45) Date of Patent: Apr. 26, 2022

(54) ELECTROLYTIC CAPACITOR AND METHOD FOR MANUFACTURING SAME

(71) Applicant: Panasonic Intellectual Property Management Co., Ltd., Osaka (JP)

(72) Inventors: Hitoshi Fukui, Nara (JP); Ai Makino, Aichi (JP); Hiroshi Kojima, Aichi (JP)

(73) Assignee: PANASONIC INTEILECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/733,095

(22) PCT Filed: Dec. 21, 2018

(86) PCT No.: PCT/JP2018/047165
§ 371 (c)(1),
(2) Date: May 15, 2020

(87) PCT Pub. No.: WO2019/131476
PCT Pub. Date: Jul. 4, 2019

(65) Prior Publication Data
US 2020/0279691 A1 Sep. 3, 2020

(30) Foreign Application Priority Data
Dec. 28, 2017 (JP) .............................. JP2017-254992

(51) Int. Cl.
*H01G 9/028* (2006.01)
*H01G 9/00* (2006.01)
(Continued)

(52) U.S. Cl.
CPC ........... *H01G 9/028* (2013.01); *H01G 9/0036* (2013.01); *H01G 9/07* (2013.01); *H01G 9/15* (2013.01)

(58) Field of Classification Search
CPC ........ H01G 9/028; H01G 9/0036; H01G 9/07; H01G 9/15
See application file for complete search history.

(56) References Cited

U.S. PATENT DOCUMENTS 6,381,121 B1 * 4/2002 Monden ................. H01G 11/48
361/525
6,517,892 B1 * 2/2003 Sakai ..................... H01G 11/48
427/80
(Continued)

FOREIGN PATENT DOCUMENTS

CN          1698145 A       11/2005
JP          2004-265941     9/2004

OTHER PUBLICATIONS

International Search Report of PCT application No. PCT/JP2018/047165 dated Mar. 19, 2019.
(Continued)

Primary Examiner — Dion R. Ferguson
(74) Attorney, Agent, or Firm — McDermott Will & Emery LLP

(57) ABSTRACT

An electrolytic capacitor includes an anode body, a dielectric layer disposed on a surface of the anode body, and a solid electrolyte layer disposed on a surface of the dielectric layer. The solid electrolyte layer includes a conductive polymer and a first compound. The first compound has a naphthalene skeleton, and includes at least one COOM1 group and at least one sulfonate group. The at least one sulfonate group is bonded to the naphthalene skeleton. The at least one COOM1 group is bonded to the naphthalene skeleton, where M1 is a hydrogen atom, a metal atom, or an onium group.

8 Claims, 1 Drawing Sheet

(51) Int. Cl.
*H01G 9/07* (2006.01)
*H01G 9/15* (2006.01)

(56) References Cited

U.S. PATENT DOCUMENTS

| | | | |
|---|---|---|---|
| 2005/0237696 | A1 | 10/2005 | Takeda et al. |
| 2010/0165548 | A1* | 7/2010 | Sugihara .............. C08K 5/0091 361/527 |
| 2019/0062501 | A1* | 2/2019 | Onodera .................. C08K 5/09 |
| 2020/0279692 | A1* | 9/2020 | Fukui ................... H01G 9/0036 |

OTHER PUBLICATIONS

English Translation of Chinese Office Action dated Jun. 1, 2021 for the related Chinese Patent Application No. 201880082978.3.

\* cited by examiner

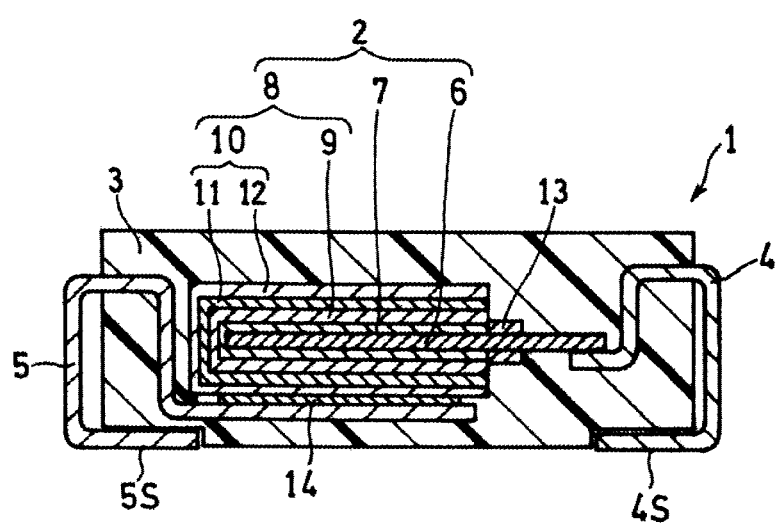

ELECTROLYTIC CAPACITOR AND METHOD FOR MANUFACTURING SAME

This application is a U.S. national stage application of the PCT International Application No. PCT/JP2018/047165 filed on Dec. 21, 2018, which claims the benefit of foreign priority of Japanese patent application No. 2017-254992 filed on Dec. 28, 2017, the contents all of which are incorporated herein by reference.

TECHNICAL FIELD

The present invention relates to an electrolytic capacitor and a method for manufacturing the same.

BACKGROUND

As a small-sized capacitor with large capacitance and low equivalent series resistance (ESR), an electrolytic capacitor has been regarded as promising candidate. The electrolytic capacitor includes an anode body, a dielectric layer formed on the anode body, and a solid electrolyte layer formed on the dielectric layer and containing a conductive polymer.

The solid electrolyte layer including the conductive polymer generally contains an acidic compound as a dopant. However, when the acidity of the acidic compound is excessively strong, for example, the dopant de-doped in a high humidity environment may cause deterioration in the dielectric layer. Thus, Unexamined Japanese Patent Publication No. 2004-265941 proposes using 3-sulfo-1,8-naphthalic acid as a dopant.

SUMMARY 3-sulfo-1,8-naphthalic acid is an excellent dopant in terms of a moisture resistance property, but there is room for improvement in terms of a heat resistance property.

Solution to Problem

One aspect of the present invention relates to an electrolytic capacitor including: an anode body; a dielectric layer disposed on a surface of the anode body; and a solid electrolyte layer disposed on a surface of the dielectric layer. The solid electrolyte layer includes a conductive polymer and a first compound. The first compound has a naphthalene skeleton, and includes at least one COOM1 group and at least one sulfonate group. The at least one sulfonate group is bonded to the naphthalene skeleton. The at least one COOM1 group is bonded to the naphthalene skeleton, where M1 is a hydrogen atom, a metal atom, or an onium group.

Another aspect of the present invention relates to an electrolytic capacitor including: an anode body; a dielectric layer disposed on a surface of the anode body; and a solid electrolyte layer disposed on a surface of the dielectric layer. The solid electrolyte layer includes a conductive polymer and a first compound. The first compound has a naphthalene skeleton, and includes one COOM1 group and at least one sulfonate group. The at least one sulfonic acid group is bonded to the naphthalene skeleton. The one COOM1 group is bonded to the naphthalene skeleton, where M1 is a hydrogen atom, a metal atom, or an onium group.

Still another aspect of the present invention relates to a method for manufacturing an electrolytic capacitor. The method includes: preparing an anode body that includes a dielectric layer; and polymerizing a precursor of a conductive polymer in presence of a first compound to form a solid electrolyte layer including the conductive polymer and the first compound. The first compound has a naphthalene skeleton, and includes at least one COOM1 group and at least one sulfonate group. The at least one sulfonate group is bonded to the naphthalene skeleton. The at least one COOM1 group is bonded to the naphthalene skeleton, where M1 is a hydrogen atom, a metal atom, or an onium group.

Still another aspect of the present invention relates to a method for manufacturing an electrolytic capacitor. The method includes: preparing an anode body that includes a dielectric layer; and polymerizing a precursor of a conductive polymer in presence of a first compound to form a solid electrolyte layer including the conductive polymer and the first compound. The first compound has a naphthalene skeleton, and includes one COOM1 group and at least one sulfonic acid group. The at least one sulfonic acid group is bonded to the naphthalene skeleton. The one COOM1 group is bonded to the naphthalene skeleton, where M1 is a hydrogen atom, a metal atom, or an onium group.

According to the present invention, the electrolytic capacitor excellent in both moisture resistance property and heat resistance property can be provided.

BRIEF DESCRIPTION OF DRAWINGS

FIG. 1 is a schematic sectional view illustrating an electrolytic capacitor according to an exemplary embodiment of the present invention.

DESCRIPTION OF EMBODIMENT

An electrolytic capacitor according to an exemplary embodiment of the present invention includes an anode body, a dielectric layer disposed on a surface of the anode body, and a solid electrolyte layer disposed on a surface of the dielectric layer. The solid electrolyte layer includes a conductive polymer and a first compound. The first compound is excellent as a dopant that can improve the conductivity of the conductive polymer. It is considered that the first compound is easily taken into the conductive polymer and hardly de-doped. By the solid electrolyte layer including the first compound, it is possible to improve both the moisture resistance property and heat resistance property of the electrolytic capacitor.

The moisture resistance property is evaluated, for example, based on the change rates of the capacitance and the ESR after the storage of the electrolytic capacitor at 85° C./85% relative humidity (RH) for 125 hours with a rated voltage applied. In other words, the better the moisture resistance property is, the higher the resistance to corrosion of the anode body (particularly aluminum) is.

The heat resistance property is evaluated, for example, based on the change rates of the capacitance and the ESR after the storage of the electrolytic capacitor at 145° C. for 125 hours under unloaded state.

One kind of the first compound has a naphthalene skeleton, and includes at least one COOM1 group bonded to the naphthalene skeleton and at least one sulfonate group bonded to the naphthalene skeleton. Here, in COOM1, M1 is a hydrogen atom, a metal atom, or an onium group.

The naphthalene skeleton means a concept including naphthalene and a naphthalene derivative. The naphthalene derivative comprehensively means naphthalene in which a hydrogen atom has been substituted with another group.

The COOM1 group means a carboxylic acid group or a carboxylate group. The carboxylate group is a salt-type COOM1 group formed by a reaction between the carboxylic acid group and an alkali. When a plurality of COOM1 groups are bonded to the naphthalene skeleton, the plurality of COOM1 groups may be the same or different from each other. The carboxylate group is directly bonded to the naphthalene skeleton in the form of an onium salt, a metal salt, or the like.

The COOM1 group may be ionically dissociated and may be present as a COO anion group. And the COO anion group may be in a bonding state or a pseudo-bonding state, by an electrical interaction, with a conductive polymer or a cation (M1 ion, etc.) in the solid electrolyte layer. The pseudo-bonding state means a state that two entities are present within a distance at which a mutual influence between them is exerted by the electrical interaction, and have electric neutrality as a whole.

A number of COOM1 groups bonded to the naphthalene skeleton may be 1 to 7, preferably 1 to 3, more preferably 1 or 2, and most preferably 1. The smaller the number of COOM1 groups is, the more the function as a dopant to the conductive polymer tends to be enhanced. The COOM1 group may be bonded to any position of the naphthalene skeleton. The first compound may be a mixture of a plurality of isomers having bonding positions of the COOM1 group which are different from each other. Meanwhile, the COOM1 group is preferably bonded to a first position and/or a second position of the naphthalene skeleton in at least a part (e.g., more than and equal to 30 mol %, more preferably more than and equal to 50 mol %) of the first compound.

Examples of the metal atom M1 include an alkali metal being a monovalent metal, and divalent or higher-valent metals such as an alkaline earth metal. As the alkali metal, Na, Li and the like are preferred. As the divalent or higher valent metal, Ca, Mg and the like are preferred. When M1 is a divalent or higher metal, a plurality of COO anion groups are bonded to the naphthalene skeleton, and one metal form a salt with two or more COO anion groups among the plurality of COO anion groups.

The sulfonate group is a salt-type $SO_3$-containing group formed by a reaction between a sulfonic acid group and an alkali, and can be represented as a $SO_3M2$ group. When a plurality of sulfonate groups are bonded to the naphthalene skeleton, the plurality of sulfonate groups may be the same or different from each other. The $SO_3M2$ group is directly bonded to the naphthalene skeleton in the form of an onium salt, a metal salt, or the like. M2 is a metal atom or an onium group.

The $SO_3M2$ group may be ion-dissociated and may be present as a $SO_3$ anion group, and the $SO_3$ anion group may be in a bonding state or a pseudo-bonding state, by an electrical interaction, with a conductive polymer or a cation (M2 ion, etc.) in the solid electrolyte layer.

A number of $SO_3M2$ groups bonded to the naphthalene skeleton may be 1 to 7, preferably 1 to 3, more preferably 1 or 2, and most preferably 1. The smaller the number of $SO_3M2$ groups is, the more the function as a dopant to the conductive polymer tends to be enhanced. The sulfonate group may be bonded to any position of the naphthalene skeleton. The first compound may be a mixture of a plurality of isomers having bonding positions of the sulfonate group which are different from each other.

Examples of the metal atom M2 include an alkali metal being a monovalent metal, and divalent or higher-valent metals such as an alkaline earth metal. As the alkali metal, Na, Li and the like are preferred. As the divalent or higher valent metal, Ca, Mg and the like are preferred. When M2 is a divalent or higher metal, a plurality of $SO_3$ anion groups are bonded to the naphthalene skeleton, and one metal form a salt with two or more $SO_3$ anion groups among the plurality of $SO_3$ anion groups.

Examples of the onium group M1 or M2 include an onium group derived from an amine compound having an amino group such as an $-NH_2$ group, an $-NH$ group, and an $-N$ group. Specifically, the onium group is a cationic group represented by $NR_4$, where R may be independently a hydrogen atom or a hydrocarbon group.

The hydrocarbon group bonded to the nitrogen atom N of the amino group is a linear or branched alkyl group (C1 to C4 alkyl groups, etc.), an aromatic group (a group containing a benzene ring, a naphthalene ring, etc.), or the like. The hydrocarbon group may further includes an amino group. That is, a number of amino groups in the onium group is not limited to one but may be two or more.

Specific examples of the amine compound having a $-NH_2$ group include, for example, butylamine, hexylamine, pentylamine, peptylamine, octylamine, nonylamine, decylamine, undecylamine, dodecylamine, 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, aniline, phenylenediamine, diaminonaphthalene and derivatives of these.

Specific examples of the amine compound having an $-NH$ group include dipropylamine, diisopropylamine, methylhexylamine, diisobutylamine, ethylhexylamine, diphenylamine, N,N-dimethylethylenediamine, and derivatives of these.

Specific examples of the amine compound having a $-N$ group include N,N-dimethylethylamine, N,N-dimethylpropylamine, N,N-dimethylbutylamine, N,N-dimethylpentylamine, N,N-dimethylhexylamine, N,N-dimethylhebutylamine, N,N-dimethyloctylamine, N,N-dimethylnonylamine, N,N-dimethyldecylamine, N,N-dimethylundecylamine, N,N-dimethyldodecylamine, triethylamine, tripropylamine, tributylamine, dimethylcyclohexylamine, and derivatives of these.

At least a part of the first compound is specifically represented by general formula (1).

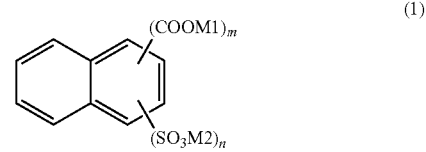

(1)

Here, M1 is a hydrogen atom, a metal atom, or an onium group. M2 is a metal atom or an onium group. Each of m and n is an integer more than or equal to 1.

A first compound in which M1 or M2 is Na among the first compounds represented by general formula (1) and a first compound represented by general formula (2) in which M1 and M2 are Na are preferred in terms of availability and ease of synthesis.

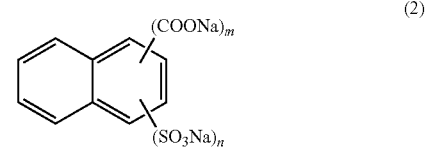

(2)

Among the first compounds represented by general formula (2), a first compound represented by general formula (3) in which m=1 and n=1 is preferred.

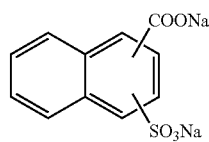
(3)

Alternatively, a first compound represented by general formula (4) in which m=2 and n=1 is preferred, and these first compounds represented by general formulas (3) and (4) are particularly preferred in terms of availability and ease of synthesis.

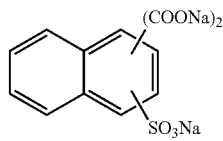
(4)

The first compound may further include a sulfonic acid group (SO3H) so long as the first compound includes a sulfonate group. Further, a compound in which the sulfonate group of the first compound has been changed to the sulfonic acid group (hereinafter, referred to as a sulfonic acid type compound) may be used in combination with the first compound. Meanwhile, a number in mols of the first compound is preferably greater than that of the sulfonic acid type compound. The SO3H group may be ion-dissociated and may be present as a SO3 anion group. The SO3 anion group may be in a bonding state or a pseudo-bonding state, by an electrical interaction, with a conductive polymer or a cation (hydrogen ion, etc.) in the solid electrolyte layer.

The sulfonic acid type compound may be a compound represented by, for example, general formula (5).

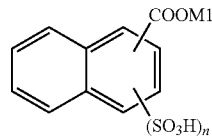
(5)

Among the sulfonic acid type compounds represented by general formula (5), a sulfonic acid type compound represented by general formula (6) in which n=1 is particularly preferred.

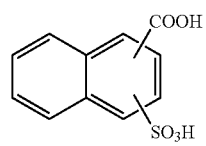
(6)

The content ratio of the first compound included in the solid electrolyte layer ranges preferably from 0.1 part by mass to 50 parts by mass, inclusive, with respect to 100 parts by mass of the conductive polymer.

The solid electrolyte layer may further include, as an acid component, a second compound different from the first compound. The second compound may be, for example, at least one selected from a group consisting of sulfuric acid and phosphoric acid. Meanwhile, a number in moles of the first compound is preferably greater than that of the second compound.

Next, a method for manufacturing an electrolytic capacitor will be described.

A method for manufacturing an electrolytic capacitor includes: (i) preparing an anode body that includes a dielectric layer; and (ii) polymerizing a precursor of a conductive polymer in presence of a first compound, to form a solid electrolyte layer including the conductive polymer and the first compound on a surface of the dielectric layer.

(i) Step of Preparing Anode Body that Includes Dielectric Layer

The anode body includes a valve metal, an alloy including the valve metal, or the like. As the valve metal, for example, aluminum, tantalum, niobium, and titanium are used preferably. One type of valve metal may be used alone, or two or more types may be used in combination. The anode body is obtained by, for example, roughening a surface of a base material (foil-like or plate-like base material, etc.) including a valve metal by etching or the like. The anode body may be a molded body of particles including a valve metal or its sintered body. Note that the sintered body has a porous structure. That is, when the anode body is a sintered body, the whole anode body may be porous.

When the obtained anode body is immersed into an anodization tub filled with an anodizing solution (e.g., phosphoric acid aqueous solution) and anodized, an oxide film of a valve metal is formed on a surface of the anode body as a dielectric layer. An aqueous solution of nitric acid, acetic acid, sulfuric acid, or the like may be used as the anodizing solution. In the case of use of aluminum as the valve metal, the dielectric layer includes $Al_2O_3$. And in the case of use of tantalum as the valve metal, the dielectric layer includes $Ta_2O_5$. When the anode body is porous, the dielectric layer is formed along a surface of the anode body (the surface including inner wall surfaces of the holes and pits of the anode body).

(ii) Step of Forming Solid Electrolyte Layer on Surface of Dielectric Layer

Next, the precursor of the conductive polymer is polymerized in the presence of the first compound to generate a conductive polymer. And the solid electrolyte layer including the conductive polymer and the first compound is formed on the surface of the dielectric layer. The solid electrolyte layer may be formed so as to cover at least a part of the dielectric layer.

The conductive polymer may be, for example, a π-conjugated conductive polymer. Examples of the conductive polymer include polymers with a basic skeleton of polypyrrole, polythiophene, polyfuran, polyaniline, polyacetylene, polyphenylene, polyphenylenevinylene, polyacene, and/or polythiophenvinylene. The conductive polymer includes a homopolymer, a copolymer of two or more monomers, and derivatives of these polymers. For example, polythiophene includes poly(3,4-ethylenedioxythiophene) and the like. The conductive polymer has high conductivity and excellent ESR properties. As the conductive polymer, one kind may be used alone, or two or more kinds may be used in combination. The weight-average molecular weight of the conductive polymer is not particularly limited, but ranges, for example, from 1,000 to 1,000,000, inclusive.

Examples of the precursor of the conductive polymer include monomers and/or oligomers capable of forming a conductive polymer. As the polymerization method, chemical oxidative polymerization or electrolytic oxidative polymerization can be employed. In particular, the first compound is suitable as a dopant when the conductive polymer is polymerized by the electrolytic polymerization.

The electrolytic polymerization proceeds by, for example, immersing an anode body that includes a dielectric layer into a polymerization liquid that contains a first compound and a monomer and/or oligomer capable of forming a conductive polymer, and allowing a current to flow with the anode body as an electrode, or scanning a potential on the electrodes. The concentration of the monomer and/or oligomer in the polymerization liquid may range, for example, from 0.1 mol/L to 2 mol/L, inclusive. The concentration of the first compound in the polymerization liquid may range, for example, from 0.01 mol/L to 1 mol/L, inclusive. The dielectric layer is formed along the surface of the anode body (the surface including the inner wall surfaces of the holes and pits of the anode body). Polymerizing the precursor in the presence of the dielectric layer facilitates forming the first conductive polymer layer deep into the holes and pits.

The polymerization liquid may further contain an acid component different from the first compound as the second compound. For example, adding at least one selected from the group consisting of sulfuric acid and phosphoric acid to the polymerization liquid facilitates the electrolytic polymerization to proceed, leading to improvement in the generation efficiency of the conductive polymer.

The pH of the polymerization liquid is preferably lower than or equal to 5, more preferably lower than or equal to 4, still more preferably lower than or equal to 3.5, and most preferably lower than or equal to 3.1. In order to reduce the pH, the concentration of the second compound in the polymerization liquid may be increased. Meanwhile, when the concentration of the second compound is excessively high, the proportion of the second compound incorporated into the conductive polymer increases, and thus the proportion of the first compound incorporated as a dopant tends to decrease. The pH of the polymerization liquid is preferably higher than or equal to 1.5, and more preferably higher than or equal to 2.0. The pH of the polymerization solution is further preferably higher than or equal to 2.5.

In a case where the precursor of the conductive polymer is subjected to the chemical oxidative polymerization, the polymerization may be performed in the presence of an oxidizing agent (catalyst) to promote the polymerization. As the oxidizing agent, metal sulfonates such as ferrous sulfate and ferric sulfate, and persulfates such as ammonium persulfate, sodium persulfate and potassium persulfate can be used.

The conductive polymer may be synthesized in advance before being attached to the anode body including the dielectric layer. For example, a solution or dispersion liquid containing a conductive polymer and a first compound (hereinafter, referred to as a dispersion) may be applied onto a dielectric layer and then dried to form a solid electrolyte layer. As the solvent or the dispersion medium of the dispersion, for example, water, an organic solvent, or a mixture of the water and organic solvent is used.

The solid electrolyte layer may further include, as a dopant, a third compound other than the first compound and the second compound. Meanwhile, a number in moles of the first compound is preferably greater than that of the third compound. As the third compound, a compound including an anionic group, such as a sulfonic acid group, a carboxyl group, a phosphoric acid group ($-O-P(=O)(-OH)_2$), and/or a phosphonic acid group ($-P(=O)(-OH)_2$). Examples of the third compound include alkylbenzenesulfonic acid such as benzenesulfonic acid and p-toluenesulfonic acid, naphthalenesulfonic acid, and anthraquinonesulfonic acid.

(iii) Step of Forming Cathode Layer

By sequentially applying a carbon paste and a silver paste on a surface of the solid electrolyte layer, a cathode layer made up of a carbon layer and a silver-paste layer is formed. The thickness of the carbon layer may range, for example, from 1 μm to 20 μm, inclusive, and the thickness of the silver-paste layer may range, for example, from 50 μm to 100 μm, inclusive. The carbon paste is a composition containing a conductive carbon material such as graphite. The silver-paste layer is a composition containing silver particles and resin. The configuration of the cathode layer is not limited to this but may be any configuration having a current collection function.

FIG. 1 is a schematic sectional view illustrating the electrolytic capacitor according to the present exemplary embodiment. As shown in FIG. 1, electrolytic capacitor 1 includes capacitor element 2, resin sealing material 3 for sealing capacitor element 2, anode terminal 4, and cathode terminal 5. Outside resin sealing material 3, a part of anode terminal 4 and a part of cathode terminal 5 are exposed. Anode terminal 4 and cathode terminal 5 may be formed using a metal such as copper or a copper alloy. For resin sealing material 3, for example, an epoxy resin may be used.

Capacitor element 2 includes anode body 6, dielectric layer 7 covering a surface of anode body 6, and cathode part 8 covering a surface of dielectric layer 7. Cathode part 8 includes solid electrolyte layer 9 covering the surface of dielectric layer 7, and cathode lead-out layer 10 covering a surface of solid electrolyte layer 9. Cathode lead-out layer 10 includes carbon layer 11 and silver-paste layer 12.

Anode body 6 includes a region facing cathode part 8 and a region not facing cathode part 8. The region not facing cathode part 8 is electrically connected to anode terminal 4 by welding. Insulating separation layer 13 is formed in a portion adjacent to cathode part 8 in the region not facing cathode part 8 so as to cover the surface of anode body 6 in a band shape to restrict the contact between cathode part 8 and anode body 6. Cathode terminal 5 is electrically connected to cathode part 8 via adhesive layer 14 made of a conductive adhesive. Principal surfaces 4S and 5S of anode terminal 4 and cathode terminal 5 are exposed from the same surface of resin sealing material 3. The exposed surface is used for solder connection with a substrate (not shown) on which electrolytic capacitor 1 is to be mounted.

The electrolytic capacitor of the present invention is not limited to the electrolytic capacitor having the above structure but can be applied to electrolytic capacitors having various structures. For example, the present invention can be applied to a wound electrolytic capacitor, an electrolytic capacitor using a sintered body of metal powder as an anode body, and the like.

Example 1

The electrolytic capacitor shown in FIG. 1 was produced in the following manner, and its characteristics were evaluated.

(1) Step of Preparing Anode Body

An aluminum foil (thickness: 100 μm) was prepared as a base material, and the surface of the aluminum foil was subjected to etching treatment to obtain anode body 6.

(2) Step of Forming Dielectric Layer

A dielectric layer including aluminum oxide ($Al_2O_3$) was formed on the surface of the anode body by immersing the anode body in a phosphoric acid solution with a concentration of 0.3% by mass (solution temperature of 70° C.) and applying a DC voltage of 70 V for 20 minutes.

(3) Step of Forming Solid Electrolyte Layer

A solid electrolyte layer including polypyrrole as a conductive polymer was formed on the dielectric layer by electrolytic polymerization. First, an aqueous solution containing a pyrrole monomer and disodium sulfo-1-naphthoate (monocarboxysulfonic acid) being the first compound was prepared as a polymerization liquid. The pyrrole monomer concentration of the polymerization liquid is 0.5 mol/L, and the concentration of disodium sulfo-1-naphthoate is 0.3 mol/L. The pH of the polymerization liquid was adjusted to 3.0 with sulfuric acid.

The anode body and a counter electrode were immersed into the polymerization liquid, the counter electrode was brought close to the surface of the anode body, and electrolytic polymerization was performed at a polymerization liquid temperature of 25° C. and a polymerization voltage of 3 V to form a solid electrolyte layer.

(4) Step of Forming Cathode Lead-Out Layer

A dispersion liquid of graphite particles dispersed in water was applied onto the surface of the solid electrolyte layer, and then dried in the air to form a carbon layer. Next, a silver paste containing silver particles and an epoxy resin was applied onto the surface of the carbon layer, and then heated to form a silver-paste layer.

(5) Assembly of Electrolytic Capacitor

An anode terminal, a cathode terminal, and an adhesive layer were disposed in a capacitor element, and the capacitor element was sealed with a resin sealing material to complete an electrolytic capacitor A1 having a rating of 2 V and 30 μF.

Example 2

An electrolytic capacitor A2 was produced in the same manner as the electrolytic capacitor A1, except that disodium sulfo-2-naphthoate (sodium monocarboxysulfonate) was used as the first compound.

Example 3

An electrolytic capacitor A3 was produced in the same manner as the electrolytic capacitor A1, except that trisodium sulfo-1,8-naphthalate (sodium dicarboxysulfonate) was used as the first compound.

Example 4

An electrolytic capacitor A4 was produced in the same manner as the electrolytic capacitor A1, except that sulfo-1-naphthoic acid (monocarboxysulfonic acid) was used as the first compound and the pH was adjusted to 1.5.

Example 5

An electrolytic capacitor A5 was produced in the same manner as the electrolytic capacitor A1, except that sulfo-2-naphthoic acid (monocarboxysulfonic acid) was used as the first compound and the pH was adjusted to 1.5.

Comparative Example 1

An electrolytic capacitor B1 was produced in the same manner as the electrolytic capacitor A1, except that sulfo-1,8-naphthalic acid (dicarboxysulfonic acid) was used instead of the first compound and the pH was adjusted to 1.5.

Comparative Example 2

An electrolytic capacitor B2 was produced in the same manner as the electrolytic capacitor A1, except that naphthalenesulfonic acid was used instead of the first compound and the pH was adjusted to 1.5.

Comparative Example 3

An electrolytic capacitor B3 was produced in the same manner as the electrolytic capacitor A1, except that sodium naphthalenesulfonate was used instead of the first compound and the pH was adjusted to 3.0.

Comparative Example 4

An electrolytic capacitor B4 was produced in the same manner as the electrolytic capacitor B3, except that the pH of the polymerization liquid was adjusted to 1.5.

The following evaluations were performed on the electrolytic capacitors of the examples and the comparative examples produced above.

[Evaluation]

(a) Heat Resistance Property

After the electrolytic capacitor was stored at a temperature of 145° C. for 125 hours, an ESR value (mΩ) and capacitance (μF) at a frequency of 100 kHz of the electrolytic capacitor were measured in an environment at 20° C. using an inductance-capacitance-resistance (LCR) meter for four-terminal measurement, to determine a change rate ($R_1$) of the ESR and a change rate ($C_1$ (%)) of the capacitance with respect to the initial value.

(b) Moisture Resistance Property

After a rated voltage was applied to the electrolytic capacitor for 125 hours in an environment of 85° C./85% Rh, an ESR value (mΩ) and capacitance (μF) at a frequency of 100 kHz of the electrolytic capacitor were measured in an environment at 20° C. using the LCR meter for four-terminal measurement, to determine a change rate ($R_2$) of the ESR and a change rate ($C_2$ (%)) of the capacitance with respect to the initial value.

TABLE 1

| Capacitor | Dopant | Heat resistance property | | Moisture resistance property | |
|---|---|---|---|---|---|
| | | $C_1$ | $R_1$ | $C_2$ | $R_2$ |
| A1 | Disodium sulfo-1-naphthoate | −2% | 1.1 | 2% | 1.9 |
| A2 | Disodium sulfo-2-naphthoate | −2% | 1.1 | 4% | 1.4 |
| A3 | Trisodium sulfo-1,8-naphthalate | −1% | 1.2 | 2% | 2.4 |
| A4 | Sulfo-1-naphthoic acid | −9% | 8.3 | 3% | 1.5 |
| A5 | Sulfo-2-naphthoic acid | −5% | 8.2 | 5% | 1.5 |
| B1 | Sulfo-1,8-naphthalic acid | −6% | 8.2 | 4% | 3.0 |
| B2 | Naphthalenesulfonic acid | −14% | 21.6 | −87% | 26.8 |
| B3 | Sodium naphthalenesulfonate | −9% | 3.0 | −44% | 22.5 |
| B4 | Sodium naphthalenesulfonate | −6% | 9.8 | −84% | 26.8 |

It can be understood that Examples 1 to 5 each have an excellent moisture resistance property. It can be understood that among the examples, the use of the first compound having a sulfonate group improves heat resistance property in addition to moisture resistance property.

The electrolytic capacitor according to the present invention can be used for various applications where excellent moisture resistance property and heat resistance property are required.

The invention claimed is:

1. An electrolytic capacitor comprising:
an anode body;
a dielectric layer disposed on a surface of the anode body; and
a solid electrolyte layer disposed on a surface of the dielectric layer,
wherein:
the solid electrolyte layer includes a conductive polymer and a first compound,
the first compound has a naphthalene skeleton and includes at least one COOM1 group and at least one sulfonate group, the at least one sulfonate group being bonded to the naphthalene skeleton, the at least one COOM1 group being bonded to the naphthalene skeleton, where M1 is a hydrogen atom, a metal atom, or an onium group, and
the first compound includes a compound represented by general formula (1),

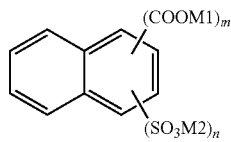
(1)

where M2 is a metal atom or an onium group, and each of m and n is an integer more than or equal to 1.

2. The electrolytic capacitor according to claim 1, wherein in general formula (1), each of $M_1$ and $M_2$ is Na.

3. The electrolytic capacitor according to claim 1, wherein:
the solid electrolyte layer includes a second compound different from the first compound, and
the second compound is an acid component.

4. The electrolytic capacitor according to claim 3, wherein the acid component is at least one selected from a group consisting of sulfuric acid and phosphoric acid.

5. A method for manufacturing an electrolytic capacitor, the method comprising:
preparing an anode body that includes a dielectric layer; and
polymerizing a precursor of a conductive polymer in presence of a first compound to form a solid electrolyte layer including the conductive polymer and the first compound,
wherein:
the first compound has a naphthalene skeleton and includes at least one COOM1 group and at least one sulfonate group, the at least one sulfonate group being bonded to the naphthalene skeleton, the at least one COOM1 group being bonded to the naphthalene skeleton, where M1 is a hydrogen atom, a metal atom, or an onium group, and
the first compound includes a compound represented by general formula (1),

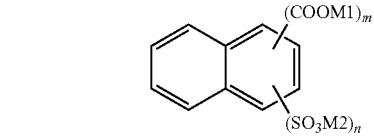
(1)

where M2 is a metal atom or an onium group, and each of m and n is an integer more than or equal to 1.

6. The method for manufacturing an electrolytic capacitor according to claim 5, wherein:
the polymerizing of the precursor is performed in presence of the first compound and a second compound different from the first compound, and
the second compound is an acid component.

7. The method for manufacturing an electrolytic capacitor according to claim 6, wherein the acid component is at least one selected from a group consisting of sulfuric acid and phosphoric acid.

8. The method for manufacturing an electrolytic capacitor according to claim 5, wherein the polymerizing of the precursor is performed by electrolytic polymerization.

* * * * *